United States Patent [19]

Moeller et al.

[11] Patent Number: 5,892,027
[45] Date of Patent: Apr. 6, 1999

[54] PROCESS FOR THE PRODUCTION OF NEUTRALIZED POLYSACCHARIDE-BASED POLYCARBOXYLATES

[75] Inventors: Thomas Moeller; Herbert Fischer, both of Duesseldorf, Germany

[73] Assignee: Henkel Kommanditgesellschaft auf Aktien, Duesseldorf, Germany

[21] Appl. No.: 913,071

[22] PCT Filed: Feb. 27, 1996

[86] PCT No.: PCT/EP96/00791

§ 371 Date: Oct. 7, 1997

§ 102(e) Date: Oct. 7, 1997

[87] PCT Pub. No.: WO96/27618

PCT Pub. Date: Sep. 12, 1996

[30] Foreign Application Priority Data

Mar. 7, 1995 [DE] Germany .................. 195 07 717.2

[51] Int. Cl.$^6$ .................................................. C07H 1/00
[52] U.S. Cl. ...................... 536/124; 536/105; 510/471
[58] Field of Search ...................... 510/561, 471, 510/534, 533; 536/104, 105, 97, 120, 124

[56] References Cited

U.S. PATENT DOCUMENTS

| | | | |
|---|---|---|---|
| 2,472,590 | 6/1949 | Kenyon et al. | 260/209 |
| 4,056,400 | 11/1977 | Diamantoglou et al. | 106/162 |
| 4,090,016 | 5/1978 | Tsuji et al. | 536/1.1 |
| 4,362,635 | 12/1982 | Dhein et al. | 252/56 S |
| 4,435,377 | 3/1984 | Rothbühr | 423/460 |
| 4,664,839 | 5/1987 | Rieck | 252/175 |
| 4,820,439 | 4/1989 | Rieck | 252/135 |
| 5,069,919 | 12/1991 | Weibel et al. | 426/261 |
| 5,180,398 | 1/1993 | Boardman et al. | 8/181 |
| 5,541,316 | 7/1996 | Engelskirchen et al. | 510/471 |

FOREIGN PATENT DOCUMENTS

| | | |
|---|---|---|
| 1 036 455 | 8/1978 | Canada . |
| 0 009 746 | 4/1980 | European Pat. Off. . |
| 0 51 147 | 5/1982 | European Pat. Off. . |
| 0 164 514 | 12/1985 | European Pat. Off. . |
| 24 12 837 | 10/1974 | Germany . |
| 44 02 851 | 8/1995 | Germany . |
| 44 26 443 | 2/1996 | Germany . |
| WO93/16110 | 8/1993 | WIPO . |

OTHER PUBLICATIONS

Engelskirchen et al., "Polysaccharid–Derivate," a part of Methoden der Organischen Chemie (Houben–Weyl), Band E20, *Makromolekulare Stoffe*, Bartl et al. (eds.), 1987 (New York, NY), Georg Thieme Verlag (Publ.), only pp. 2042–2168 supplied.

Nevell, "Oxidation of Cellulose," Ch. 10 in *Cellulose Chemistry and Its Applications*, John Wiley & Sons, (Chichester, GB), 1983, only pp. 243–265 supplied.

Kunii et al., "Fluidization and Mapping of Regimes," Ch. 3 in *Fluidization Engineering, 2nd Ed.*, Butterworth–Heinemann (Boston, MA), 1991, only pp. 8–9 and 61–94 supplied.

Beránek et al.(I), "Sonderfälle von Wirbelschichten," Ch. 7 in *Grundlagen der Wirbelschicht–Technik*, Krausskopf–Verlag (Leipzig, GDR), 1975, only pp. 65–80 supplied.

Beránek et al.(II), "Homogene Wirbelschicht Aus Geometrisch Ähnlichen Teilchen," § 1.3.3. in *Wirbelschichttechnik*, VEB Deutscher Verlag für Grunstoffindustrie (Leipzig, GDR), 1964, only pp. 68–83 supplied.

*Primary Examiner*—Marian C. Knod
*Assistant Examiner*—L. Eric Crane
*Attorney, Agent, or Firm*—Ernest G. Szoke; Wayne C. Jaeschke; Real J. Grandmaison

[57] ABSTRACT

A process for producing solid polycarboxylic acid salts from polysaccharides with gaseous nitrogen dioxide and dinitrogen tetroxide to at least partially convert the primary alcohol groups of the polysaccharides into carboxyl groups and form a solid polycarboxylic acid and then mixing the polycarboxylic acid with a solid neutralizing agent to at least partially neutralized the carboxylic acid groups of the polycarboxylic acid.

13 Claims, No Drawings

PROCESS FOR THE PRODUCTION OF NEUTRALIZED POLYSACCHARIDE-BASED POLYCARBOXYLATES

BACKGROUND OF THE INVENTION

1. Field of the Invention

This invention relates to a simplified process for the production of polycarboxylates in their salt form by selective oxidation of polysaccharides with gaseous nitrogen dioxide and dry neutralization of the oxidation product obtained.

2. Discussion of Related Art

Extensive knowledge exists on the production of polycarboxylates by oxidative treatment of polysaccharides, for example cellulose, starch and dextrins, cf. for example Houben-Weyl "Methoden der organischen Chemie", Thieme-Verlag, Stuttgart (1987), Vol. E 20, Makromolekulare Stoffe, subchapter entitled "Polysaccharid-Derivate" edited by Dr. K. Engelskirchen, loc. cit., pages 2042 et seq., more particularly pages 2124 et seq. (oxidation products of cellulose) and pages 2166 et seq. (oxidized starches), and the publication entitled "Cellulose Chemistry and its Applications" (1983), John Wiley & Sons, Chichester, GB, more particularly chapter 10 "Oxidation of Cellulose" by T. P. Nevell and the extensive literature cited therein, loc. cit., pages 262 to 265.

Roughly summarized, it may be said that several oxidizing agents are commonly used for the oxidation of polysaccharides, more particularly polyglucosans produced exclusively from glucose. They include, for example, (atmospheric) oxygen, hydrogen peroxide, sodium hypochlorite or bromite, periodic acid and periodates, lead (IV) acetate, nitrogen dioxide and cerium(IV) salts. These oxidizing agents react very differently with the anhydroglucose units, cf. for example the formula schemes in Houben-Weyl, loc. cit., page 2124. For example, periodates or lead(IV) acetate promote C—C cleavage of the anhydroglucose rings; so-called 2,3-dialdehyde cellulose is obtained from cellulose and dialdehyde starch is similarly obtained from starch. It is also known that, when cellulose is exposed to the action of nitrogen dioxide, oxidation of the primary alcohol group to the carboxyl group is by far the predominant reaction. The oxidizing agent, generally present in equilibrium with dinitrogen tetroxide, may be used in gaseous form or in solution in an inert organic solvent, cf. Houben-Weyl loc. cit., page 2125 and the primary literature cited in this connection therein. It is even possible starting out from starch to achieve substantially selective oxidations of the primary alcohol group of the anhydroglucose units to the carboxyl group. Thus, the oxidation of starch with gaseous nitrogen dioxide or nitrogen dioxide dissolved in water or in various organic solvents at room temperature/normal pressure is known from U.S. Pat. No. 2,472,590.

Under these conditions, the substantially complete conversion of the primary alcohol groups of the polysaccharides into carboxyl groups is only achieved after very long reaction times which can amount to several days. In addition, large amounts of nitrogen dioxide, based on the polysaccharide to be oxidized, are required in the known process. A significant improvement in the production of such oxidation products of polysaccharides is known from International patent application WO 93/16110. The invention disclosed in this document is based on the observation that polycarboxylates can be obtained in high yields from polysaccharides by a simple process in which the oxidation reaction is carried out with nitrogen dioxide/dinitrogen tetroxide in the presence of oxygen at elevated temperature and preferably at elevated pressure. The expression "nitrogen dioxide/dinitrogen tetroxide" used in the document in question and in the present specification stands for the equilibrium mixture of nitrogen dioxide and its dimer, dinitrogen tetroxide, present under the particular reaction conditions.

If the variant of the suspension- and solvent-free oxidation described in the document in question is carried out with gaseous nitrogen dioxide/dinitrogen tetroxide, a polysaccharide selectively oxidized at $C_6$ is obtained in solid form. This acid form, which shows poor solubility in water, is unsuitable for direct use as a builder or builder component (co-builder) in detergents or cleaners. It is generally preferred to use the oxidized polysaccharide in the form of a water-soluble salt, i.e. the neutralization product of the polycarboxylic acid formed during the oxidation reaction. Hitherto, it was proposed that this neutralization be carried out with aqueous base. Where this procedure is adopted, aqueous solutions of the polycarboxylate are obtained and have to be subjected to an energy-intensive drying step if the polycarboxylate is to be obtained in solid form. This may be acceptable in the production of solid detergents or cleaners providing an aqueous working-up step for removing nitrate and nitrite is provided immediately after the actual oxidation reaction and the aqueous neutralized polycarboxylate solution is further processed by spray drying. The accumulation of aqueous polycarboxylate solutions in production processes for detergents and cleaners which involve the addition of solid components is a particular disadvantage because, in their case, the removal of water from the polycarboxylate solution and the conversion of the dissolved polycarboxylate into a solid are unavoidable.

Above all in the process variant described in hitherto unpublished German patent application P 44 26 443.7, which eliminates the need for aqueous working-up of the reaction products of polysaccharides with nitrogen dioxide/dinitrogen tetroxide and for their vacuum treatment and still gives products with acceptably low nitrate and nitrite contents providing introduction of the oxidizing agent, nitrogen dioxide/dinitrogen tetroxide, is terminated before completion of the actual oxidation reaction and the temperature is increased to a value above the reaction temperature, the aqueous neutralization of the polycarboxylic acid thus produced and the subsequent drying of the aqueous polycarboxylate solution appear entirely paradoxical.

DESCRIPTION OF THE INVENTION

The present invention, by which the problems outlined above can be solved, relates to a process for the production of solid polycarboxylic acid salts from polysaccharides by oxidation with gaseous nitrogen dioxide/dinitrogen tetroxide with at least partial conversion of the primary alcohol groups of the polysaccharides into carboxyl groups and at least partial neutralization of the carboxylic acid groups formed, characterized in that the solid polycarboxylic acid is mixed with a solid neutralizing agent.

The oxidation of the polysaccharide before the neutralization crucial to the invention is preferably carried out as described in German patent application P 44 26 443.7. This means that the reaction of the polysaccharide to be oxidized with nitrogen dioxide/dinitrogen tetroxide is only continued until at most 90%, preferably 60% to 85% and more preferably 65% to 80% of the required degree of oxidation, i.e. the degree of conversion of primary alcohol groups into carboxyl groups, is achieved. The required degree of oxidation is not fully reached until the post-oxidation phase, i.e.

after the introduction of nitrogen dioxide/dinitrogen tetroxide has been terminated, and at a temperature at least 10° C., preferably 15° C. to 80° C. and more preferably 20° C. to 50° C. higher than in the oxidation phase. It is important in this connection to ensure that an upper limit of 160° C. is not exceeded through the increase in temperature because decomposition was increasingly observed at higher temperatures.

The oxidation reaction to be terminated before complete conversion is reached is carried out at temperatures of preferably 30° C. to 70° C. and, more preferably, 40° C. to 60° C. Oxygen may be present either on its own or in conjunction with a gas that is inert under the reaction conditions. The oxygen may be added just once at the beginning of the reaction or repeatedly, if desired continuously, during the reaction. In the latter case, the oxidation reaction may be controlled in known manner as a function of temperature or pressure through the introduction of oxygen. The introduction of oxygen is preferably controlled in such a way that the reaction temperature remains in the range from 30° C. to 70° C.

Noble gases, such as helium or argon, and carbon dioxide, but especially nitrogen, nitrogen monoxide and dinitrogen monoxide and also mixtures of these gases may be used as the inert gases, i.e. gases which do not react under the particular process conditions required. The oxygen content of the gas mixture is preferably between 1% by volume and 30% by volume and more preferably between 3% by volume and 10% by volume. In one preferred embodiment of the process according to the invention, the oxygen is introduced in the form of air under pressure.

Another preferred embodiment of the process is characterized in that a pressure below 10 bar and, more particularly, in the range from 2 bar to 6 bar at the required reaction temperature is established in the reaction system before the beginning of the oxidation reaction by introducing one of the inert gases mentioned under pressure and then introducing oxygen or a mixture of oxygen with one of the inert gases mentioned under pressure several times, if desired continuously. The nitrogen dioxide/dinitrogen tetroxide may be added before or after the oxygen or rather before or after the addition of oxygen is commenced. It may be necessary to heat the reaction vessel to the required reaction temperature after the initial introduction of inert gas under pressure. During the oxidation reaction, which is best carried out with intensive mixing of the reactants, the reaction temperature may generally be maintained without external heating, i.e. solely through the quantity of oxygen added.

In the oxidation step of the process according to the invention, the oxidizing agent acts directly from the gas phase on the solid, intensively mixed polysaccharide substrates. The oxidation step is preferably carried out in a fluidized bed of polysaccharide using a gas containing nitrogen dioxide as the fluidizing agent. One such oxidation process is described in hitherto unpublished German patent application P 44 02 851.2. In the context of the present invention, a fluidized bed is understood to be the phenomenon observed when gases known as fluidizing agents flow from beneath through a layer of fine-particle material resting on horizontal perforated plates. However, the invention is by no means confined to this method of fluidization. Reference is made in this connection to the book by D. Kunii and O. Leverspiel entitled "Fluidization Engineering", Butterworth-Heinemann, 2nd Edition, 1991, more particularly the Table on pages 8 and 9 and Chapter 3. Another useful oxidation reactor is the apparatus described in EP 051 147 B1 (cf. FIG. 1), in which a gas-based fluidized bed is accommodated in a cylinder in which a shaft equipped with stirring arms is mounted for rotation. It is also possible to use a reactor with a multistage fluidized bed of the type described in Beránek/Rose/Winterstein, "Grundlagen der Wirbelschichttechnik", Krauskopf-Verlag, 1975, page 72. The reaction may readily be carried out continuously in a reactor of this type.

In this variant of the process, the fluidizing agent can leave the reaction system after flowing through the polysaccharide and, according to the invention, is replaced before the required degree of oxidation is reached by a fluidizing agent which does not contain any nitrogen dioxide/dinitrogen tetroxide. This fluidizing agent is preferably one of the inert gases described above.

In the fluidized-bed variant of the oxidation process, the necessary reaction time before addition of the nitrogen dioxide/dinitrogen tetroxide is terminated for a given polysaccharide and a given nitrogen dioxide content in the fluidizing agent is essentially determined by the required degree of oxidation and the temperature. The following figures may serve as approximate values: at a temperature of 50° C./normal pressure and using 12 mole equivalents of nitrogen dioxide per hour, based on hydroxyl groups to be oxidized, 18% to 22% of the primary alcohol groups are converted into carboxyl groups after 30 minutes, 60% to 70% after 60 minutes and 85% to 95% after 1.5 hours.

The nature of the polysaccharide used is a largely non-critical factor in the oxidation process described above. The only requirements are that it should contain carbohydrate units containing primary alcohol groups and should be present in a form which enables it to be intensively mixed with the gaseous oxidizing agent and, preferably, to form a fluidized bed, more particularly in powder form. Suitable polysaccharides are native polyglucans, more particularly starch and/or cellulose, and other polysaccharides, for example polygalactomannans, such as guaran and carubin. The polysaccharides may also be used in chemically or physically modified form providing they still contain oxidizable primary alcohol groups. By virtue of the particularly smooth reaction for which they provide and for economic reasons, starches varying in their provenance, more particularly potato starch, wheat starch, corn starch and/or tapioca starch, which are all commercially available in powder form, are preferred. Since cellulose often presents problems in the development of a fluidized bed on account of its fibrous character, it is preferably used in the form of a micropowder.

The process according to the invention, particularly where the polyglucans mentioned are used in its oxidation step, is preferably carried out over such a period that, on a statistical average, at least 15 mole-% of the oxidation product consists of oxidized anhydroglucose units corresponding to formula I:

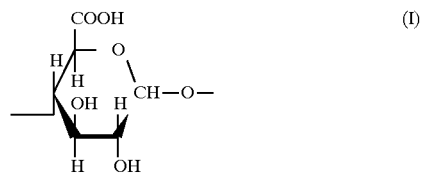

which corresponds to a carboxyl group content of at least 4% by weight.

The process according to the invention gives polyglucan-based polycarboxylates which preferably contain at least 25 mole-% and, more preferably, at least 35 mole-% of the oxidized anhydroglucose units, more particularly corresponding to formula I, in the molecule, another advantage being that no significant quantities of other secondary oxidation products are present. The upper limit to the content of units corresponding to formula I is at 100 mole-% and, more particularly, at around 95 mole-%. Polycarboxylates containing from 70 mole-% to 100 mole-%, corresponding to a carboxyl group content of up to about 25% by weight, are preferably produced by the process according to the invention.

If the polysaccharide to be oxidized shows any tendency towards agglomeration and towards the phenomenon of "channel" formation so unwanted in fluidized bed technology, its flow behavior can be significantly improved by the addition of small quantities of, in particular, solid additives, including for example magnesium oxide, calcium fluoride, calcium phosphate, fine-particle zeolites or silica gel, more particularly the silicon dioxide marketed under the name of Aerosil®. Significant flow-improving effects are achieved with only small additions of, preferably, 0.1% by weight to 5% by weight and, preferably, 0.25% by weight to 1% by weight, based on the polysaccharide to be oxidized. The polysaccharide used preferably contains no more than 15% by weight and, in particular, no more than 10% by weight of water.

Following the oxidation and, optionally, post-oxidation reaction, the carboxyl groups of the oxidation product are at least partly neutralized by treatment with a basic reagent present in solid form, i.e. are partly converted from the acid form into the salt form. Suitable neutralizing agents are any of the usual solid, more particularly powder-form, bases, more particularly alkali metal hydroxide, alkali metal carbonate, basic alkali metal silicate and basic alkali metal alumosilicate and mixtures thereof. It does not matter whether the neutralizing agent is present in water-free form or contains water of crystallization. Preferred neutralizing agents include sodium hydroxide, sodium carbonate, dried basic waterglasses and zeolites obtained without the usual washing step, i.e. basic zeolites, such as zeolite NaA, X and/or P. The neutralizing agent is preferably used in such quantities that all the carboxyl groups of the oxidation product are converted into the salt form.

The neutralization step of the process according to the invention may be carried out by fluidizing the polycarboxylic acid obtained with the solid preferably powder-form neutralizing agent in the fluidized-bed reactor immediately after the oxidation or post-oxidation reaction. If desired, the fluidized bed reactor may be heated and is preferably cooled to dissipate the heat of neutralization.

The polycarboxylic acid and the solid, preferably powder-form neutralizing agent may also be transferred to other suitable mixing units and allowed to react therein. The main objective of this is to ensure that the particles are thoroughly intermixed to guarantee good contact between the reactants. Suitable mixing units are both high-speed intensive mixers, for example the CB-Recycler® and the Pflugscharen (plowshare)-FM made by Lödige, and roll compactors, for example the roll compactors marketed by Alexanderwerke®, so-called Shugi® mixers (Hosokawa-Micron®) and nondestructive mixers, for example the mixer marketed by Forberg® and the Vrieco® mixer marketed by Hosokawa-Micron®.

The fact that the neutralization step crucial to the invention is in fact an at least partial conversion of carboxylic acid groups into carboxylic acid salts and not just a mixing process is apparent from the fact that, on dissolution in water, the heat effect occurring is distinctly weaker than that occurring where the individual substances are simultaneously introduced into water.

The polycarboxylates produced by the process according to the invention are preferably used for the production of solid detergents or cleaners by virtue of their builder or co-builder properties. In formulations such as these, they are preferably used as co-builders in quantities of 0.5% by weight to 10% by weight and, more particularly, in quantities of 2% by weight to 7% by weight, based on the total weight of the detergent/cleaner which contains an inorganic builder as its main builder. In a particularly preferred embodiment, they are used in detergents/cleaners which contain the zeolite NaA described in DE 24 12 837, for example in connection with laundry detergents, and/or the layer silicates described in European patent application EP 164 514 as principal builder and polycarboxylic acid salts produced by the process according to the invention in quantity ratios of 2:1 to 5:1. The composition of the detergents and/or cleaners may otherwise be selected virtually as required within the framework of known formulations.

EXAMPLES

Example 1

Starch was oxidized in the reactor described in Example 1 of German patent application P 44 26 443.7. To this end, 1042.8 g of potato starch, moisture content 6.8% by weight, were mixed with 0.5% by weight of Aerosil® 200 and the resulting mixture was introduced into the fluidized-bed reactor (height 80 cm, internal diameter 90 mm). Nitrogen was passed through the reactor at a rate sufficient to fluidize the starch and the reactor was heated to 50° C. Nitrogen dioxide was passed through the fluidized bed from a temperature-controlled supply bottle. The quantities of gas were adjusted to 150 standard liters per hour by means of throughflow meters calibrated for air. After 4 hours, the introduction of nitrogen dioxide was terminated and the reactor temperature was increased over a period of 30 minutes to 80° C. and kept at that level for 30 minutes. The reactor was then cooled to room temperature. A polycarboxylic acid P1 was obtained in the form of a white free-flowing powder with an acid value of 371. 110.6 g of the oxidized starch were left for 1 hour at 80° C. in a stirred fixed bed with 150 g of a freeze-dried zeolite NaA (OH value 274), nitrogen being passed over the fixed bed. The powder obtained produced an increase in temperature of +6° C. when stirred into water. The separate introduction of P1 and the zeolite into water produced an increase in temperature of 14° C.

Example 2

62 g of a polycarboxylic acid P2 (acid value 380) was produced by oxidation in a fluidized-bed reactor in the same way as in Example 1. It was left in the fluidized bed reactor, 50 g of basic sodium silicate (Portil® A) with an OH value of 472 were added and fluidized with P2 for 10 minutes using nitrogen as the fluidizing gas. A homogeneous stable product unaffected by prolonged heating to 90° C. was obtained.

Example 3

Example 2 was repeated using water-free sodium carbonate instead of the sodium silicate. A homogeneous, stable product unaffected by prolonged heating to 90° C. was again obtained.

What is claimed is:

1. A process of producing solid, water-soluble polycarboxylic acid salts from polysaccharides comprising oxidizing said polysaccharides with gaseous nitrogen dioxide and dinitrogen tetroxide comprising introducing gaseous nitrogen dioxide and dinitrogen tetroxide to said polysaccharides to at least partially convert the primary alcohol groups of said polysaccharides into carboxyl groups and form a solid polycarboxylic acid, and mixing said polycarboxylic acid with a solid neutralizing agent to at least partially neutralize the carboxylic acid groups of said polycarboxylic acid.

2. The process as in claim 1 wherein said neutralizing agent is selected from the group consisting of alkali metal hydroxide, alkali metal carbonate, alkali metal silicate, alkali metal aluminosilicate, and mixtures thereof.

3. The process as in claim 1 wherein said neutralizing agent is selected from the group consisting of sodium hydroxide, sodium carbonate, spray-dried waterglass, zeolites and mixtures thereof.

4. The process as in claim 1 wherein said neutralizing agent is present in an amount sufficient to convert all said carboxyl groups into the salt form.

5. The process as in claim 1 wherein the introduction of said nitrogen dioxide and dinitrogen tetroxide is terminated when 60% to 85% of the oxidation has occurred and the reaction mixture temperature has increased by at least 10° C.

6. The process as in claim 5 wherein the temperature is increased by 15° C. to 80° C.

7. The process as in claim 1 wherein at least 15% of the primary alcohol groups of said polysaccharides are converted into carboxyl groups.

8. The process as in claim 1 wherein said oxidizing is carried out in a fluidized bed wherein the fluidizing agent is a gas containing nitrogen dioxide.

9. The process as in claim 1 wherein said polysaccharides are selected from the group consisting of potato starch, wheat starch, corn starch and tapioca starch.

10. The process as in claim 1 wherein said polycarboxylic acid and said neutralizing agent are transferred to a mixing unit after oxidizing said polysaccharides and allowed to react therein.

11. The process as in claim 1 wherein said oxidizing is carried out in a fluidized-bed reactor and, immediately thereafter, the polycarboxylic acid obtained is fluidized with said neutralizing agent in the fluidized-bed reactor.

12. The process as in claim 1 wherein said oxidizing is carried out at a temperature of 30° C. to 70° C.

13. The process as in claim 1 wherein said polysaccharides are intensively mixed during said oxidizing.

* * * * *